Jan. 19, 1926. 1,569,966
D. E. CLAYPOOL
PISTON
Filed Nov. 24, 1922
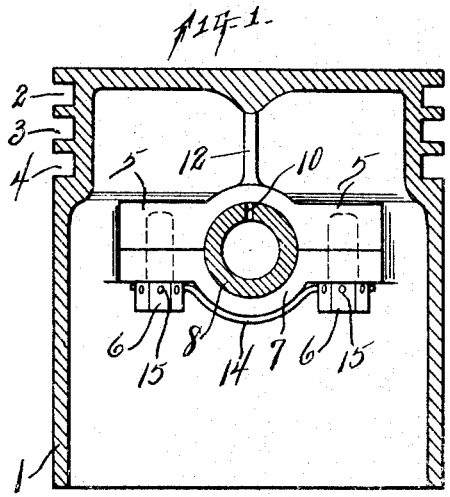
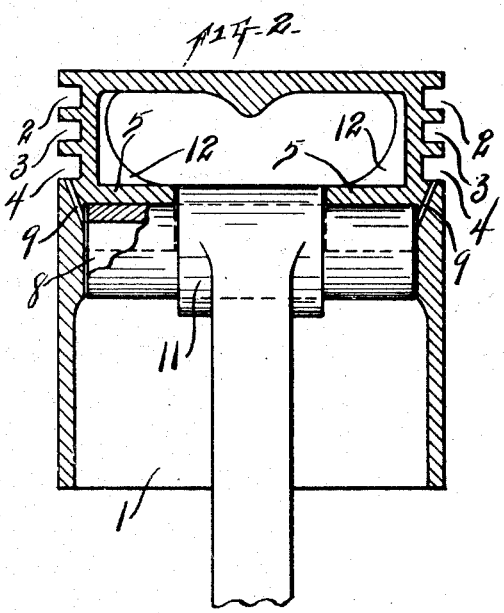
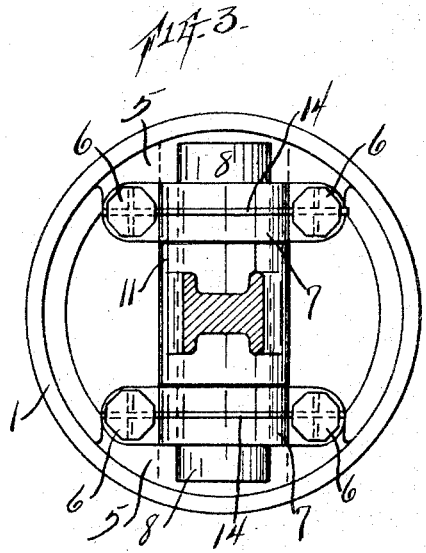
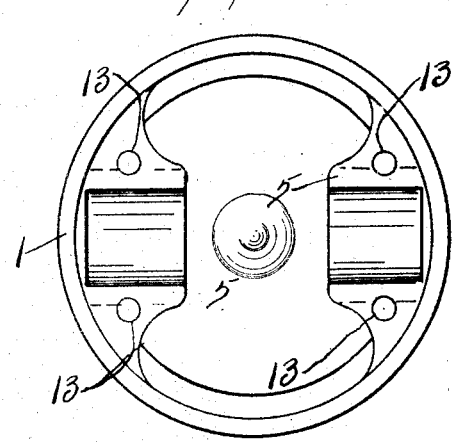
Inventor
Daniel E. Claypool
By A. L. Jackson
Attorney

UNITED STATES PATENT OFFICE.

DANIEL E. CLAYPOOL, OF FORT WORTH, TEXAS.

PISTON.

Application filed November 24, 1922. Serial No. 602,921.

*To all whom it may concern:*

Be it known that I, DANIEL E. CLAYPOOL, a citizen of the United States, residing at Fort Worth, in the county of Tarrant and State of Texas, have invented certain new and useful Improvements in Pistons, of which the following is a specification.

My invention relates to pistons and more particularly to pistons for gas or gasoline engines or engines using explosive force; and the object is to improve the construction of pistons and to provide pistons which have no openings in the side wall or periphery so that there will be nothing on the piston to score the cylinder walls. The object is to provide connections entirely on the inside of the piston for the crank arm connection. The advantage of this construction is that it eliminates two extra bearings for the working parts which frequently cause hammering or pounding in the cylinder. Another object is to provide open-ended hollow pins for making connection of the crank or piston arms with the pistons and to provide means for oiling the crank or piston arm connection automatically from the piston oiling system. Other objects and advantages will be fully explained in the following description and the invention will be more particularly pointed out in the claims.

Reference is had to the accompanying drawings which form a part of this application.

Fig. 1 is a vertical section of the piston through the connecting pin. Fig. 2 is a vertical section of a piston at right angles to the view shown in Fig. 1, the lower bearing member for the connecting pin being omitted, the crank arm being shown engaging the pin and a portion of the pin being shown in section. Fig. 3 is a bottom plan view of the piston, the crank arm being shown in section. Fig. 4 is a bottom plan view with all detachable parts omitted.

Similar characters of reference are used to indicate the same parts throughout the several views.

A piston 1 is shown with three piston ring grooves 2, 3, and 4. There are no openings through the periphery of the piston skirt for a crank arm connection. Bearings for the crank arm connections are provided within the piston. The upper or interior bearing members 5 are cast integral with the piston wall and on each side the bearing members 5 are thick enough to receive stud bolts 6. The lower or outer bearing members 7 are bolted to the interior bearing members 5 by means of bolts 6. The connecting pin 8 is preferably made hollow for carrying a supply of lubricating material for lubricating the crank arm connection. The pin 8 is supplied with oil from the groove 4 in the periphery of the piston. Ducts 9 are made from the groove 4 to the hollow end of the pin 8. An aperture 10 approximately at the central part of the pin is provided so that lubricating material may be fed to the connection 11 of the crank arm. The bearing members 5 are strengthened by integral ribs or webs 12. Holes 13 are made in the bearing members 5 for the bolts 6. After the pin 8 has been secured in the bearings, the bolts 6 are prevented from turning by wires 14 which are run through the heads 6, as shown in Figs. 1 and 3. The heads 6 have each a plurality of holes 15 so that there will be holes for the wires or rods 14 when the bolt heads are turned to different positions.

What I claim is:—

A piston having a head provided with annular grooves for piston rings and a skirt having an unbroken periphery and bearing members wholly within said piston the upper part of the bearing being integral with the skirt, and a hollow open ended pin having an aperture through its wall intermediate its ends and held in place by said bearing members and having its ends projecting in close proximity to the walls of the piston, and said piston having oil ducts leading from the lowest groove to the open ends of said pin.

In testimony whereof, I set my hand, this 20th day of November, 1922.

DANIEL E. CLAYPOOL.